US012514396B2

(12) United States Patent
Cingolani et al.

(10) Patent No.: US 12,514,396 B2
(45) Date of Patent: Jan. 6, 2026

(54) DRAIN TRAY FOR SOLENOID VALVES OF MACHINES FOR COFFEE DISPENSING AND MACHINE FOR COFFEE DISPENSING PROVIDED WITH SAID DRAIN TRAY

(71) Applicant: SIMONELLI GROUP S.P.A., Belforte del Chienti (IT)

(72) Inventors: Claudio Enrico Cingolani, Camerino (IT); Mauro Parrini, Porto Sant'elpidio (IT)

(73) Assignee: SIMONELLI GROUP S.P.A., Belforte del Chienti (IT)

( * ) Notice: Subject to any disclaimer, the term of this patent is extended or adjusted under 35 U.S.C. 154(b) by 946 days.

(21) Appl. No.: 17/766,953

(22) PCT Filed: Oct. 8, 2020

(86) PCT No.: PCT/IB2020/059468
§ 371 (c)(1),
(2) Date: Apr. 6, 2022

(87) PCT Pub. No.: WO2021/070109
PCT Pub. Date: Apr. 15, 2021

(65) Prior Publication Data
US 2024/0065473 A1 Feb. 29, 2024

(30) Foreign Application Priority Data
Oct. 10, 2019 (IT) .......................... 102019000018401

(51) Int. Cl.
A47J 31/46 (2006.01)
A47J 31/44 (2006.01)
A47J 31/54 (2006.01)

(52) U.S. Cl.
CPC ......... A47J 31/461 (2018.08); A47J 31/4403 (2013.01); A47J 31/469 (2018.08); A47J 31/542 (2013.01)

(58) Field of Classification Search
CPC ......... A47J 31/44; A47J 31/441; A47J 31/46; A47J 31/461; A47J 31/542; A47J 31/4403
See application file for complete search history.

(56) References Cited

U.S. PATENT DOCUMENTS

2004/0177760 A1*  9/2004  Eicher ................. A47J 31/56
                                                99/275
2011/0232862 A1*  9/2011  Gofton ................ B60N 3/16
                                                236/12.12

(Continued)

FOREIGN PATENT DOCUMENTS

CN    109984599 A      7/2019
EP      2499946 A1 *   9/2012  .............. A47J 31/46

(Continued)

OTHER PUBLICATIONS

International Search Report issued Feb. 5, 2021 in PCT/IB2020/059468 filed Oct. 8, 2020, 3 pages.

Primary Examiner — Steven W Crabb
Assistant Examiner — Allison E Helferty
(74) Attorney, Agent, or Firm — Oblon, McClelland, Maier & Neustadt, L.L.P.

(57) ABSTRACT

A drain tray for a solenoid valve of a machine for coffee dispensing includes a base portion that defines a collection cavity for at least one fluid coming from the machine. The drain tray includes a cover portion that defines a cover cavity which, together with the collection cavity of the base portion, defines a respective compartment. The drain tray includes at least one inlet connectable to the solenoid valve of the machine for the transit of a respective hot waste fluid towards the compartment. The drain tray includes an outlet (Continued)

for the outflow of at least one fluid coming from the machine accumulated inside the collection cavity of the base portion. The drain tray includes a heat exchanger, arranged inside the compartment having at least one coil arranged to remain at least partially immersed in the fluid of the solenoid valve of the machine.

9 Claims, 13 Drawing Sheets

(56) References Cited

U.S. PATENT DOCUMENTS

| | | | |
|---|---|---|---|
| 2012/0174796 A1* | 7/2012 | Ehrlinger | B01F 23/23412 366/152.2 |
| 2012/0240784 A1* | 9/2012 | Yang | A47J 31/469 99/293 |
| 2013/0206014 A1* | 8/2013 | Jarisch | A47J 31/407 99/302 C |
| 2016/0016129 A1* | 1/2016 | Vermeulen | B01F 23/2362 261/138 |
| 2018/0213969 A1* | 8/2018 | Fregnan | A47J 31/465 |
| 2019/0053656 A1 | 2/2019 | Locher | |

FOREIGN PATENT DOCUMENTS

| | | |
|---|---|---|
| EP | 3 443 877 A1 | 2/2019 |
| WO | WO-2016106474 A1 * | 7/2016 |

\* cited by examiner

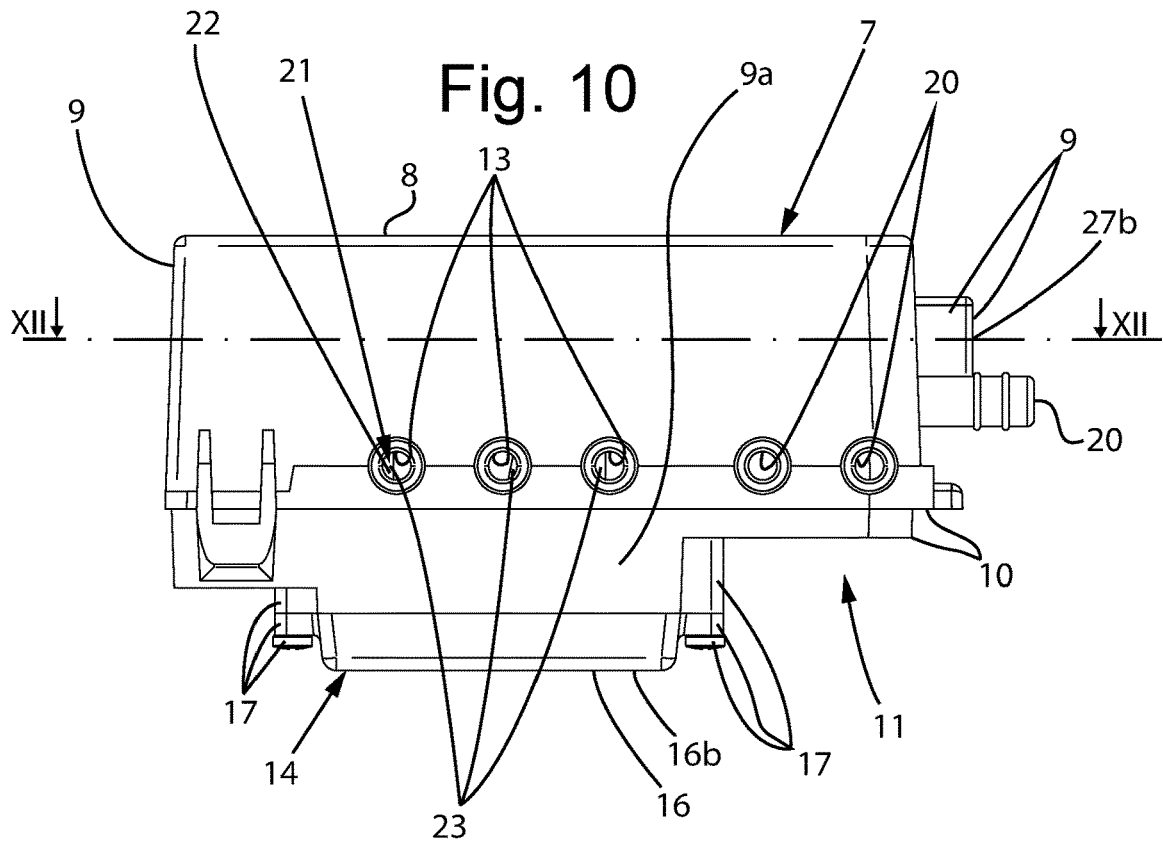
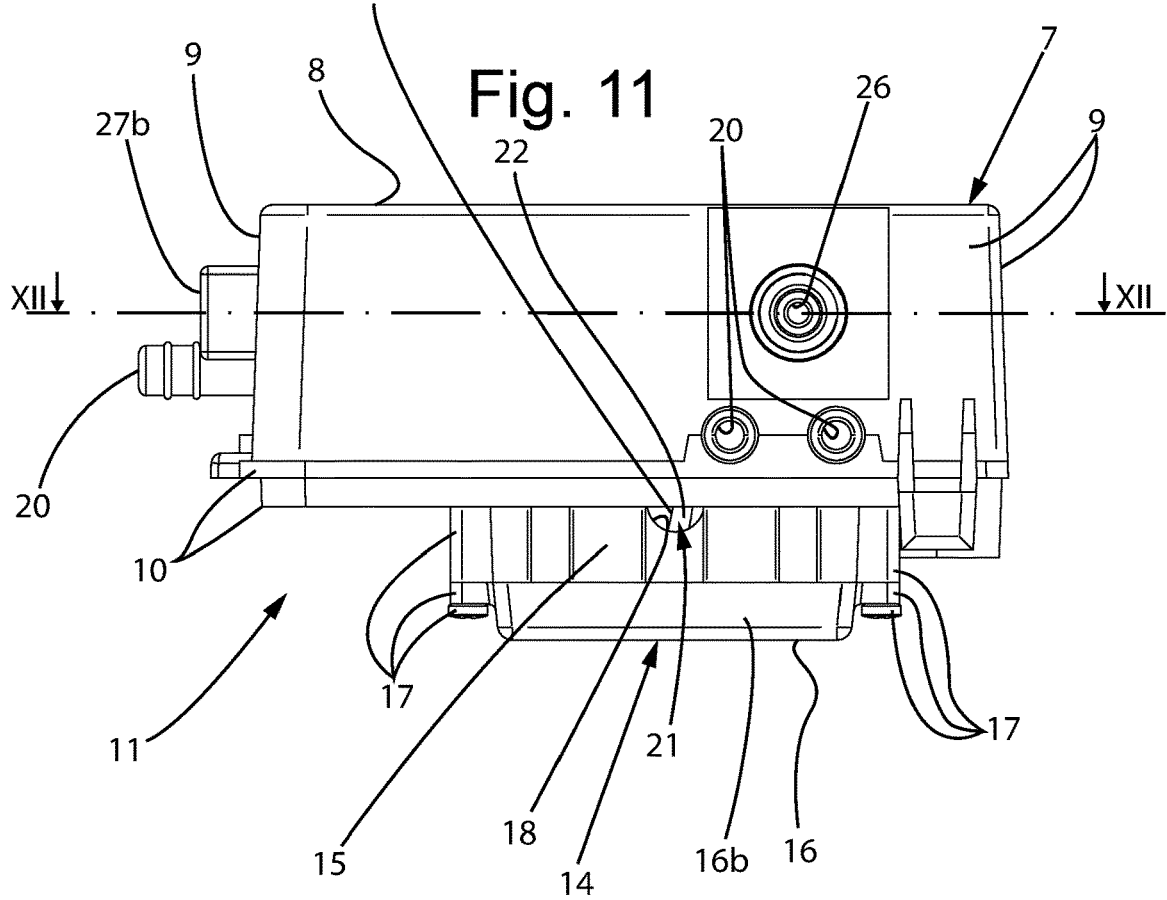

DRAIN TRAY FOR SOLENOID VALVES OF MACHINES FOR COFFEE DISPENSING AND MACHINE FOR COFFEE DISPENSING PROVIDED WITH SAID DRAIN TRAY

BACKGROUND OF THE INVENTION

FIELD OF THE INVENTION

The present invention refers to a drain tray for solenoid valves of machines for coffee dispensing.

The present invention also relates to a machine for coffee dispensing provided with the aforementioned drain tray.

The object of the present invention refers to the technical industrial sector of machines for coffee dispensing in general and, in particular, it is aimed at professional machines for coffee dispensing.

DESCRIPTION OF THE RELATED ART

As is known, the technical sector of machines for coffee dispensing is becoming more and more aligned with the general needs of reducing energy consumption and increasing the general performance of the machines that are produced and marketed.

The growing efforts by the manufacturers of machines for coffee dispensing has gradually allowed to obtain a greater reduction of heat losses to the outside, to optimize the powers and spaces of the internal components of the same, as well as to achieve significant results in terms of energy saving and overall dimensions.

Despite the various efforts to limit waste of heat to the maximum, the Applicant has found that there are still significant margins for improvement especially in relation to the drains of the solenoid valves that manage the hot water flows destined for the extraction of coffee.

With particular reference to the extraction of coffee in current machines for the preparation and delivery of the relative hot beverage, said operation is carried out by controlling corresponding flows of water heated to 90° C. which pass through respective three-way solenoid valves arranged at respective dispensing groups.

The actuation of each solenoid valve causes the transit of hot water through the corresponding dispensing group and the relative extraction of the coffee.

Once the coffee has been extracted, the excess hot water located between the coffee panel and the shower head of the dispensing group is expelled into the drain in order to lower the pressure in the area of the filter holder and thus allow the operator to remove the filter holder quickly and easily.

The hot water that is discharged by each solenoid valve first flows directly into a respective drain tray and, subsequently, into the drain of the machine for coffee dispensing resulting in a significant waste of heated water potentially reusable for the purpose of the recovery of thermal energy.

BRIEF SUMMARY OF THE INVENTION

The main object of the present invention is to propose a drain tray for solenoid valves of machines for coffee dispensing, capable of solving the problems encountered in the prior art.

It is also an object of the present invention to further reduce the heat losses of the machines for coffee dispensing.

It is also an object of the present invention to increase the performance of the machines for coffee dispensing.

A further object of the present invention is to optimize the powers of the internal components of the machines for coffee dispensing.

Finally, an object of the present invention is to reduce the overall energy consumption of the machines for coffee dispensing that is required to heat the supplied water coming from the water network or from a similar supply source.

The objects specified above and more are substantially achieved by a drain tray for solenoid valves of machines for coffee dispensing and a machine for coffee dispensing provided with such a drain tray, as described and claimed below.

It is now reported, by way of example, the description of a preferred but not exclusive embodiment of a drain tray for solenoid valves of machines for coffee dispensing and of a machine for coffee dispensing provided with said drain tray, in accordance with the present invention.

Such description will be made hereinbelow with reference to the accompanying drawings, provided for indicative only and therefore not limiting purpose, in which:

BRIEF DESCRIPTION OF THE SEVERAL VIEWS OF THE DRAWINGS

FIG. 10 is an elevation view of the components of the drain exchange tray illustrated in FIGS. 8 and 9;

FIG. 11 is a further elevation view of the components of the collection exchange tray illustrated in FIGS. 8 to 10;

DETAILED DESCRIPTION OF THE INVENTION

With reference to FIGS. 1 to 4 and 13, the number 1 generally indicates a drain tray for solenoid valves 200 of machines 100 for dispensing coffee.

Figure 3:
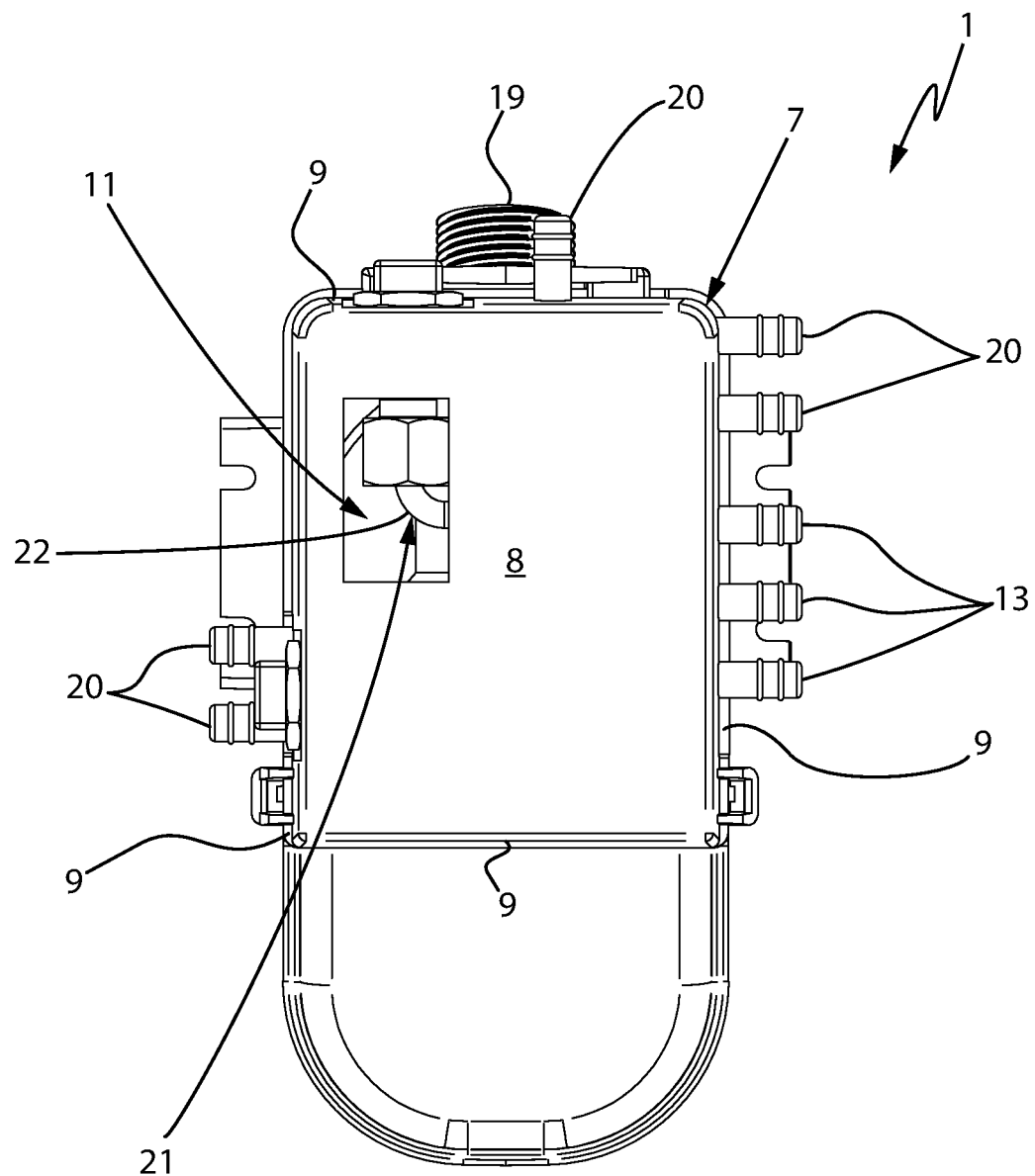
FIG. 3 is a plan view of the drain tray of the preceding figures.
Figure 4:
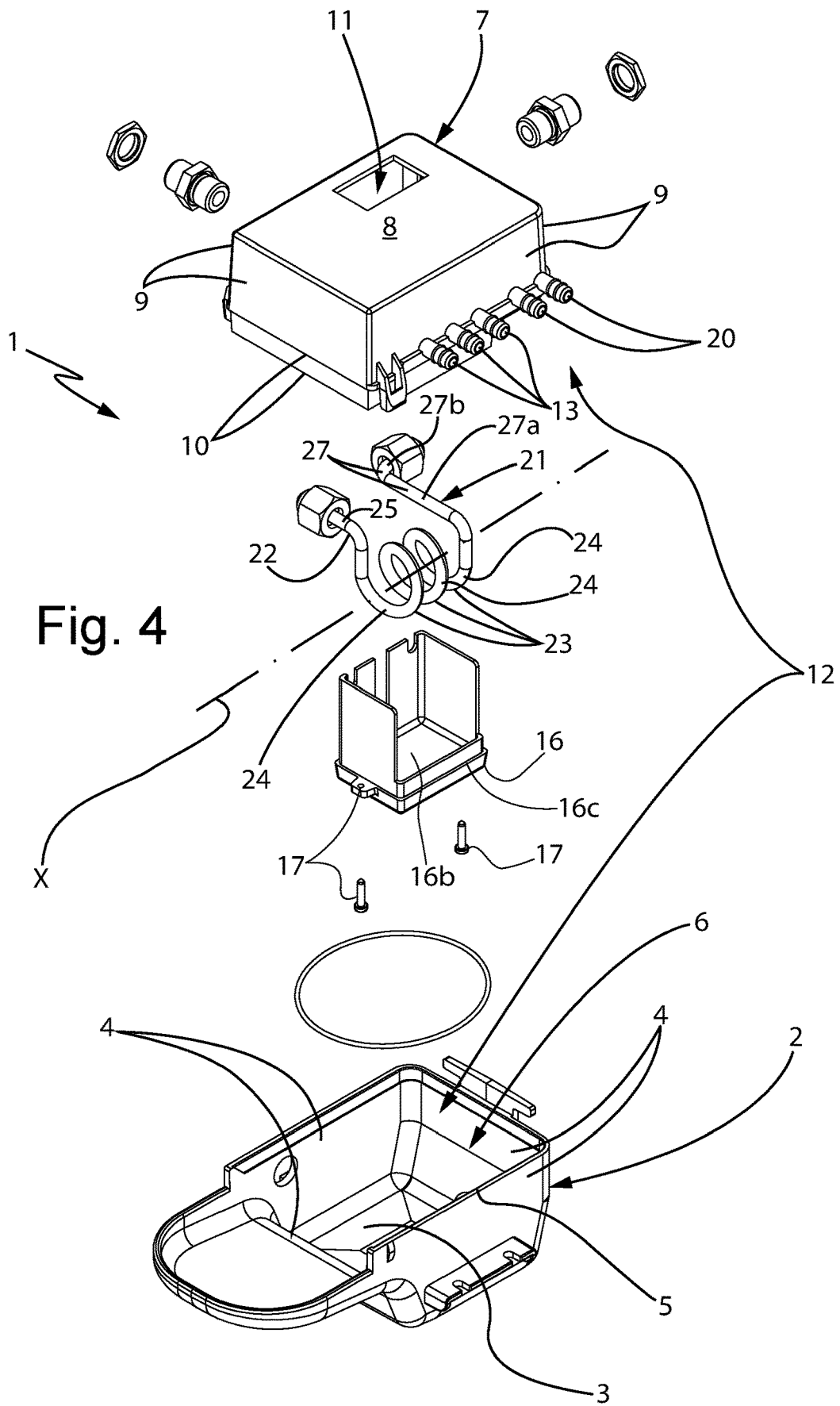
FIG. 4 is an exploded perspective view of the drain tray of the preceding figures.
Figure 5:
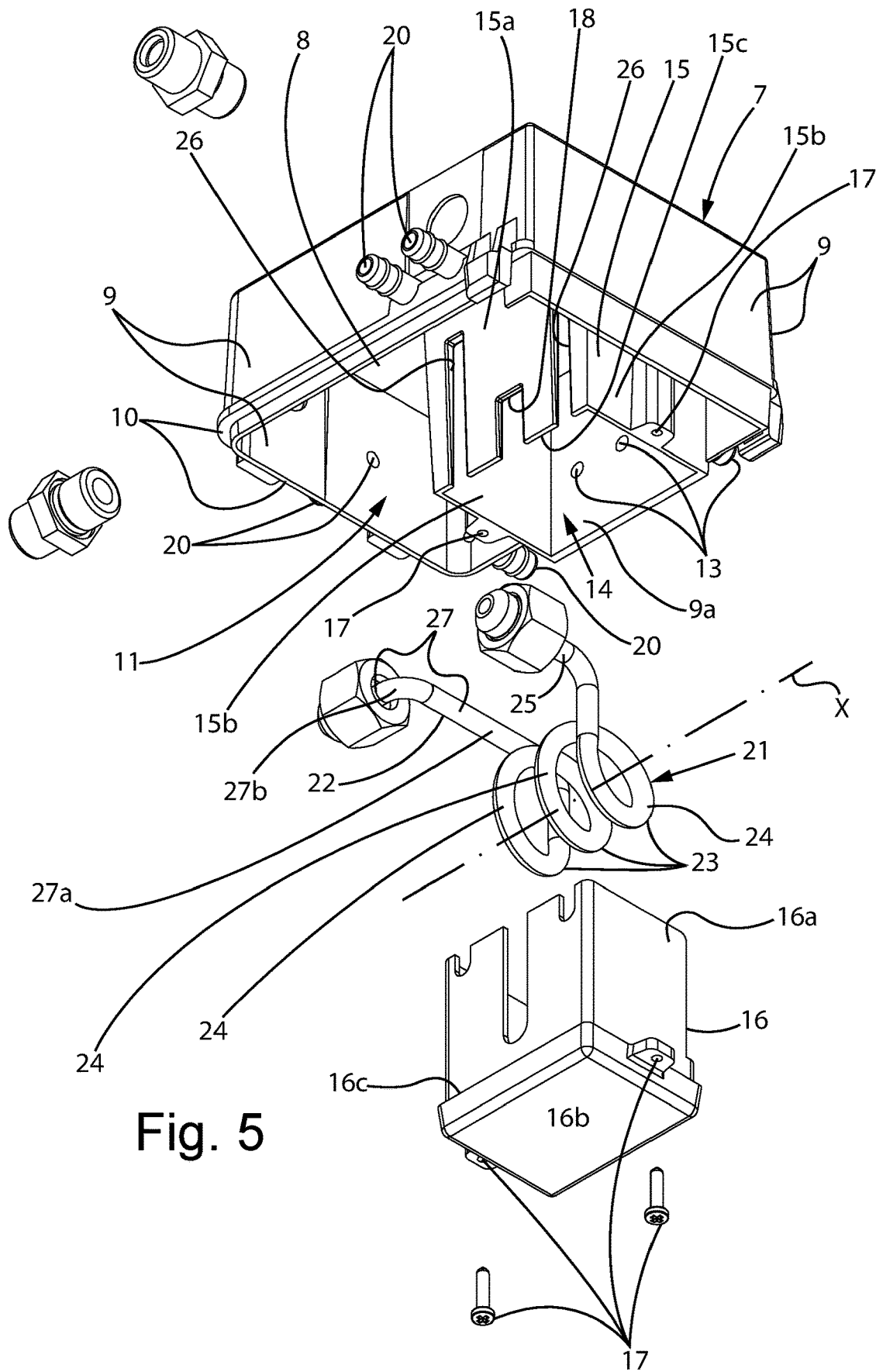
FIG. 5 is an exploded perspective view of some components of the drain tray of the preceding figures.
Figure 6:
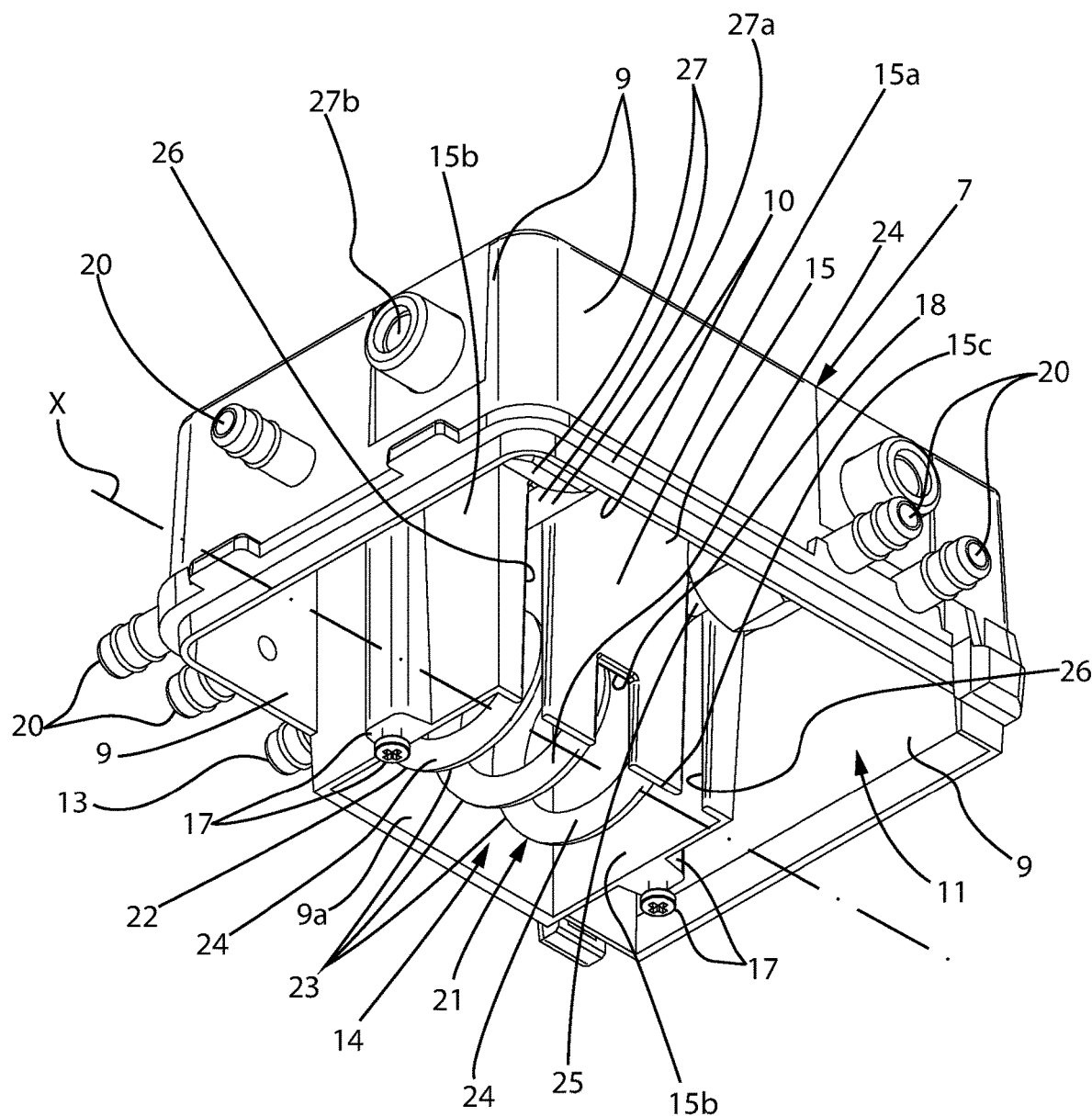
FIG. 6 is a bottom perspective view of a part of the components of the drain tray illustrated in FIG. 5 and shown in assembled condition.
Figure 7:
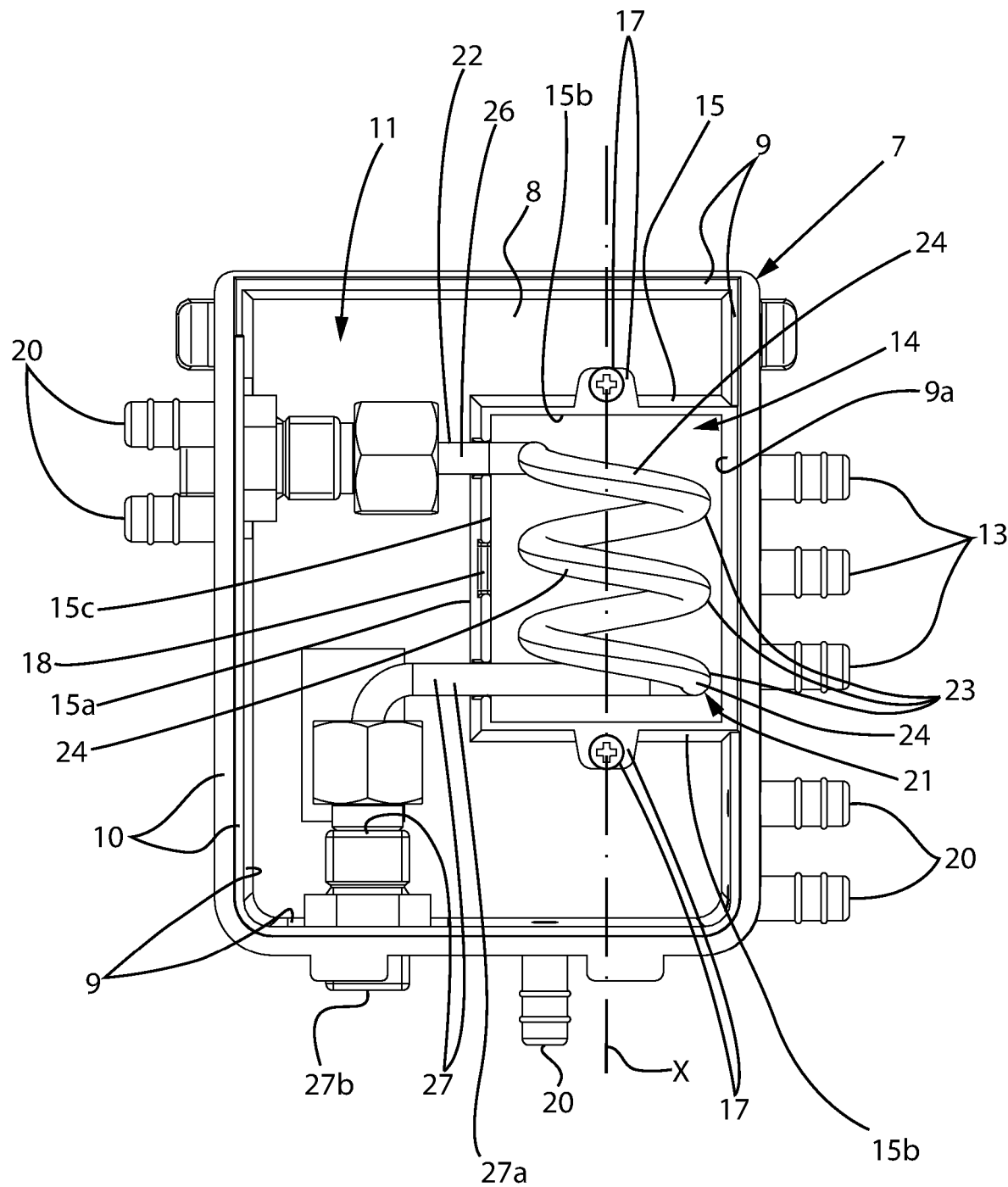
FIG. 7 is a bottom view of the components of the drain tray illustrated in FIG. 6.
Figure 8:
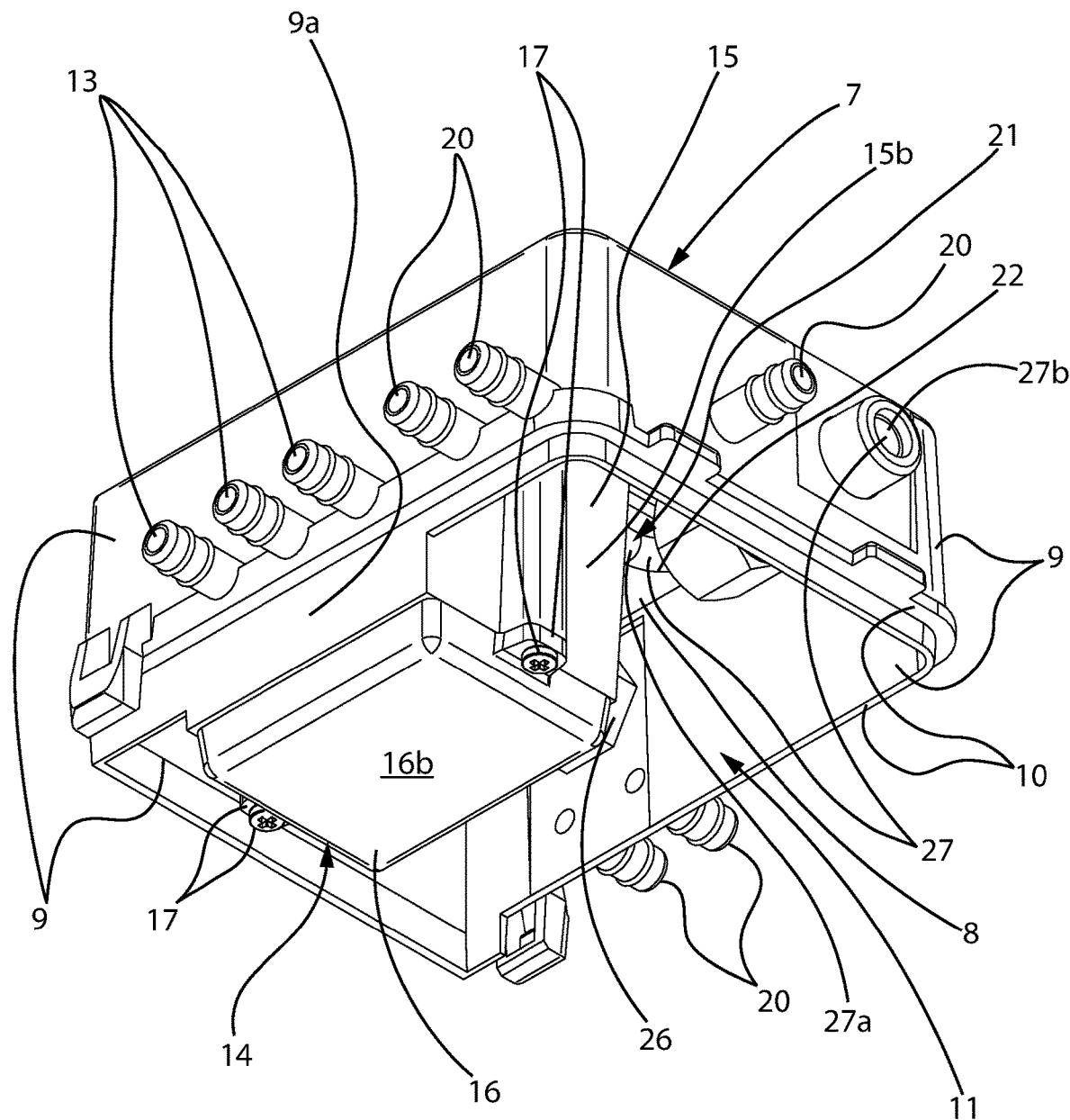
FIG. 8 is a bottom perspective view of the components of the drain tray illustrated in FIG. 5 and shown in assembled condition.
Figure 9:
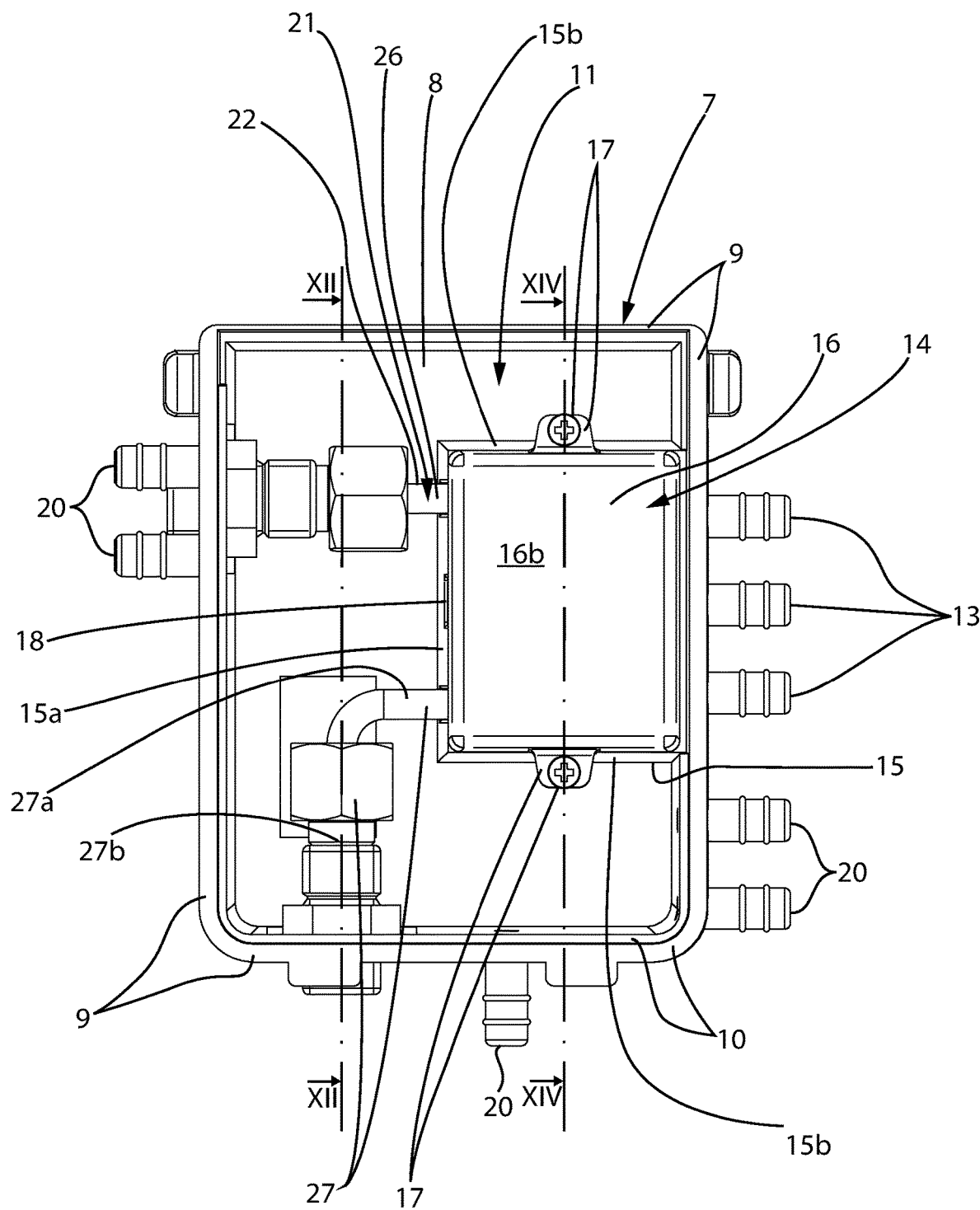
FIG. 9 is a bottom view of the components of the drain tray illustrated in FIG. 8.
Figure 12:
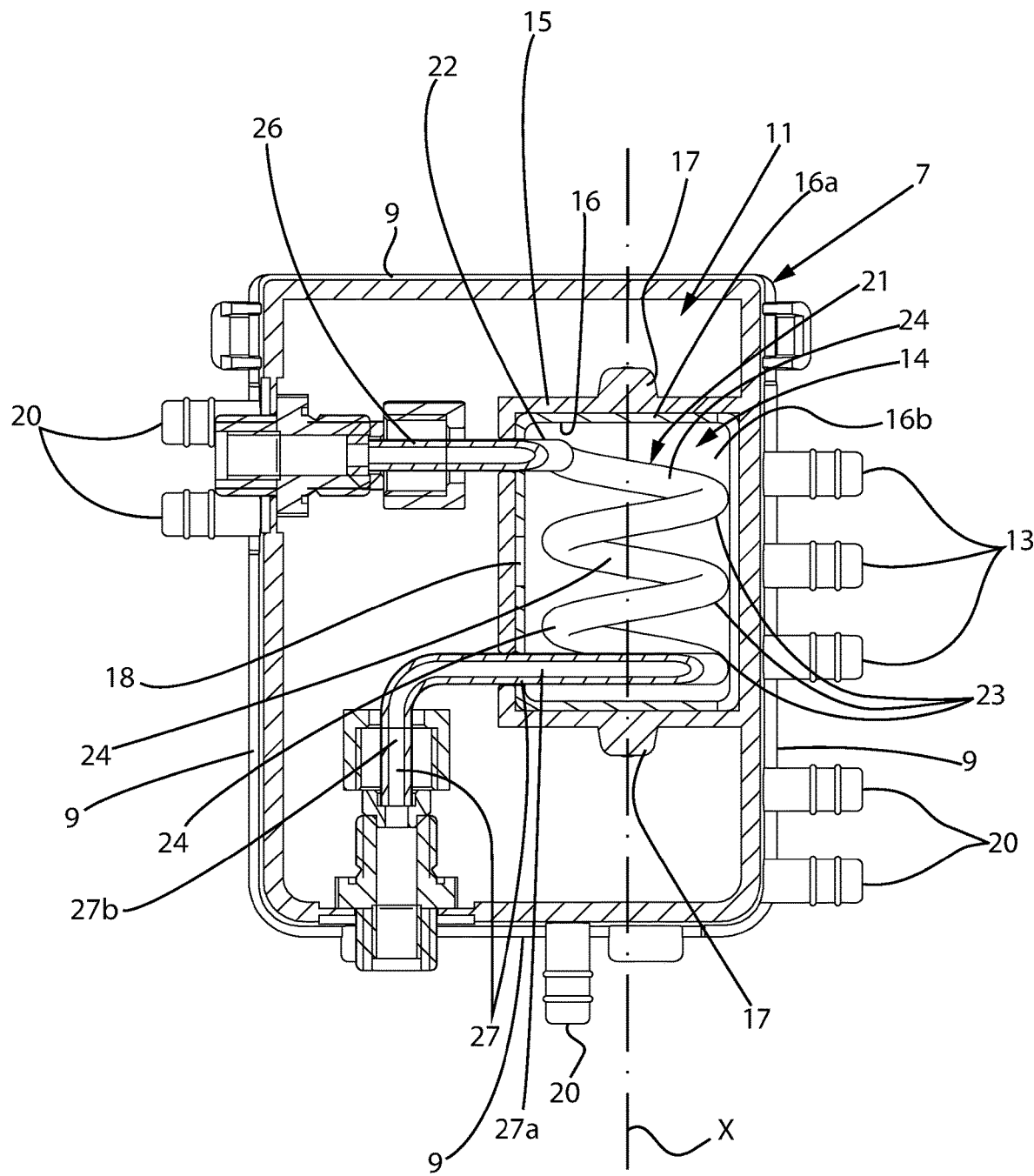
FIG. 12 is a section of the components of the drain tray illustrated in FIGS. 8 to 11, taken along the lines XII-XII of FIGS. 10 and 11.
Figure 13:
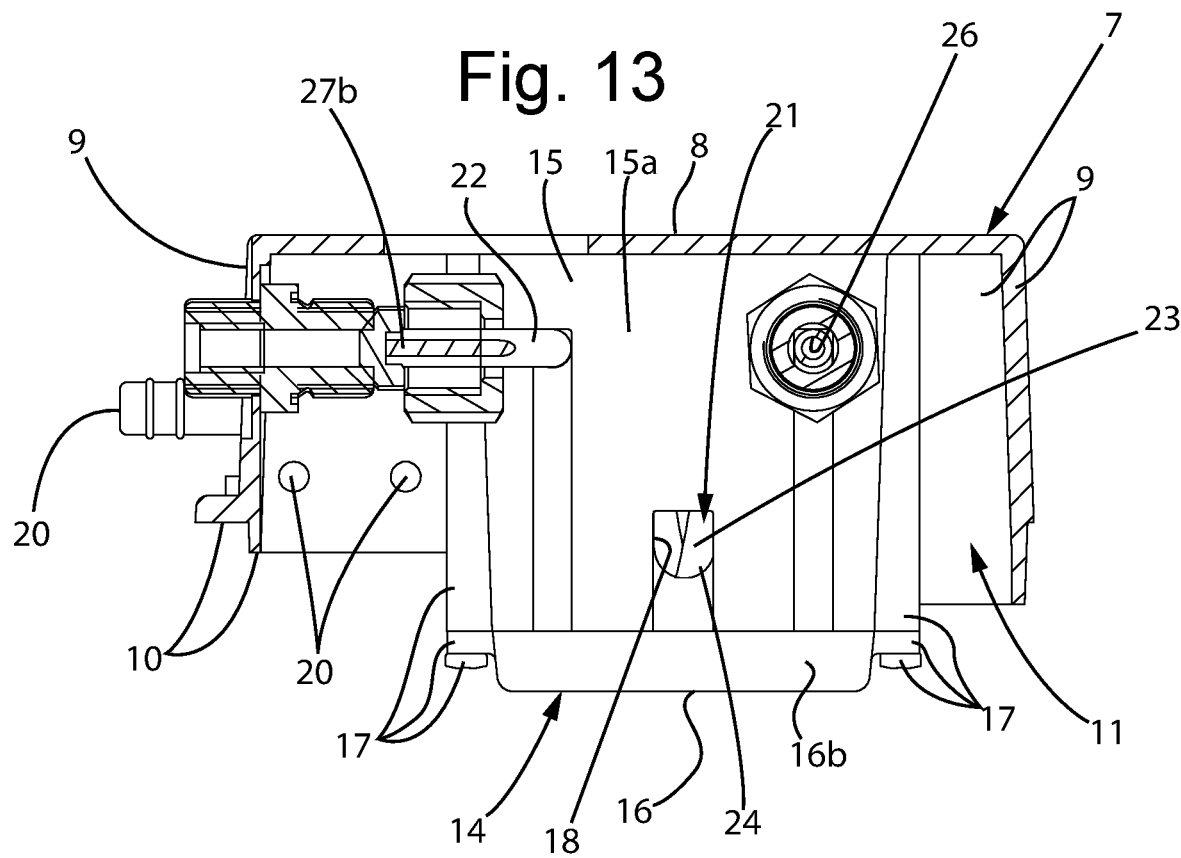
FIG. 13 is a section of the components of the drain tray illustrated in FIGS. 8 to 12, taken along the line XIII-XIII of FIG. 9.
Figure 14:
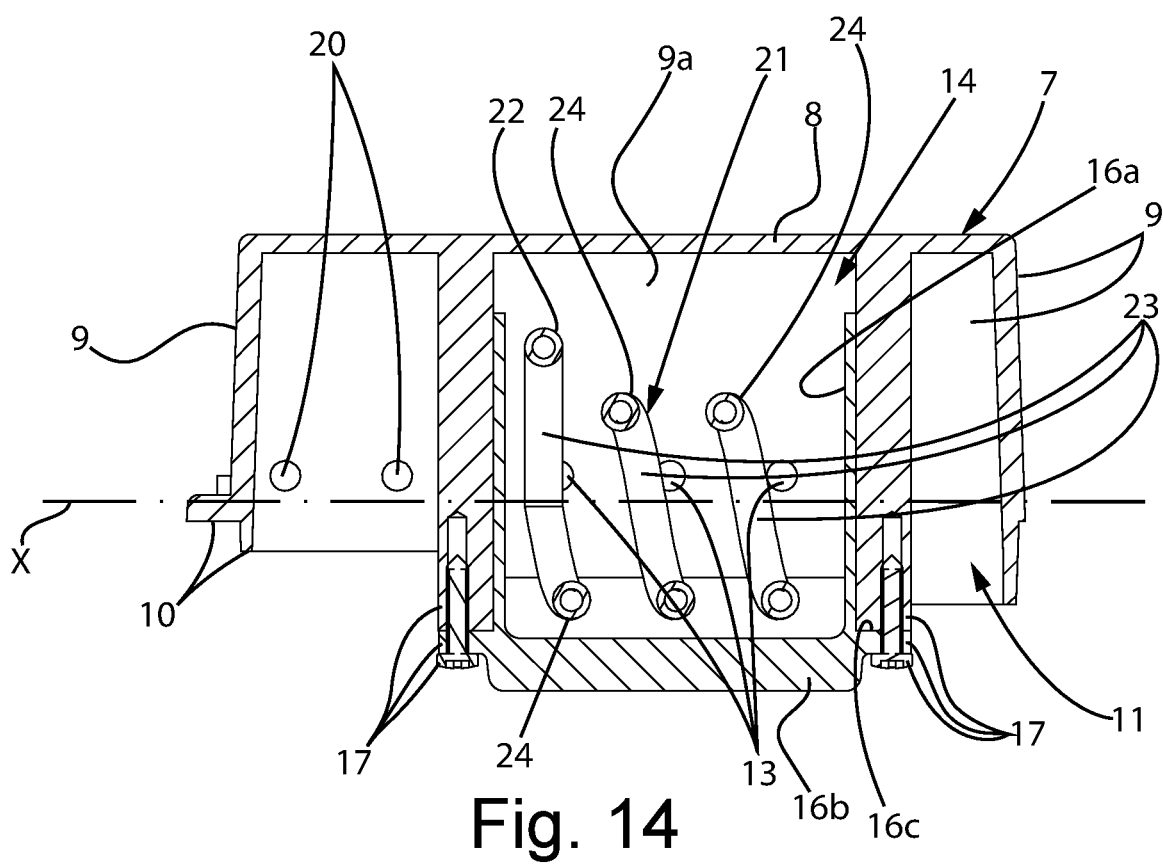
FIG. 14 is a section of the components of the drain tray illustrated in FIGS. 8 to 13, taken along the line XIV-XIV of FIG. 9.

As can be seen in FIGS. 1 to 4, the drain tray 1 comprises a base portion 2 provided with at least one bottom 3 from which transversely extends at least one side wall 4, preferably four side walls 4, which terminates at the opposite end to the bottom 3 defining at least one engagement edge 5 (FIG. 4).

The bottom 3 and the side walls 4 of the base portion 2 define at least one collection cavity 6 (FIG. 4) for the collection of one or more fluids coming from a machine 100 (FIG. 15) for coffee dispensing.

The drain tray 1 also comprises at least one cover portion 7 provided with at least one upper wall 8, preferably having a substantially rectangular shape, from which transversely extends at least one side wall 9, preferably four side walls 9, which terminates at the opposite end to the upper wall 7 defining at least one engagement edge 10 (FIG. 4) arranged to engage the engagement edge 5 of the base portion 2.

The upper wall 8 and the side walls 9 of the cover portion 7 define at least one cover cavity 11 (FIGS. 1-14).

Figure 15:
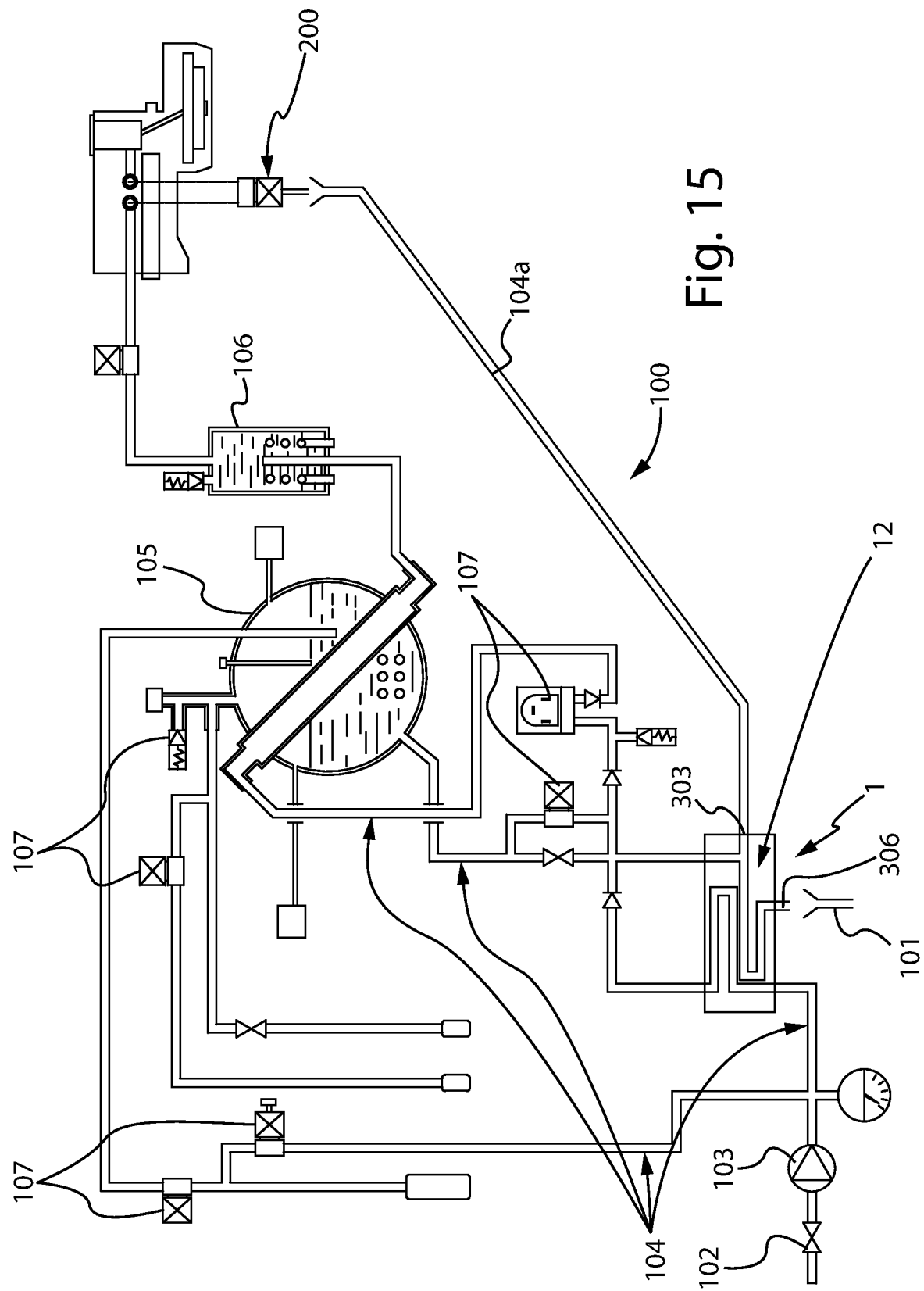
FIG. 15 is a hydraulic diagram of a machine for coffee dispensing, in accordance with the present invention, provided with the drain tray as shown in FIGS. 1 to 4.

The collection cavity 6 (FIG. 4) and the cover cavity 11 (FIGS. 1-14) of the drain tray 1 define a respective housing compartment 12 (FIGS. 4 and 15).

As can be seen in FIGS. 1, 3-10, 11 and 14, the drain tray 1 comprises at least one inlet 13 connectable to a solenoid valve 200 of a machine for coffee dispensing 100 to allow the transit of a respective hot waste fluid F1 in excess during the extraction of the coffee towards the housing compartment 12 of the drain tray 1.

In accordance with the embodiment illustrated in FIGS. 1, 3-10, 11 and 14, the drain tray 1 is provided with a series of inlets 13, for example at least one group of three inlets 13, each arranged in the cover portion 7, to convey the hot waste fluid F1 coming from at least one solenoid valve 200 of a machine for coffee dispensing 100, into a respective holding chamber 14 (FIGS. 5-14) arranged inside the housing compartment 12.

The holding chamber 14 is defined by a fixed portion 15 joined in one piece to the cover portion 2 of the drain tray 1 and a removable portion 16 which can be inserted in the fixed portion 15 and can be fixed thereon by at least one coupling element 17, preferably two or more coupling elements 17 of a known type.

In detail, the fixed portion 15 of the holding chamber 14 is delimited by: a portion 9a of a respective side wall 9 of the cover portion 7 of the drain tray 1; a front wall 15a which extends transversely from the upper wall 8 of the cover portion 7 of the drain tray 1; two side walls 15b transversal to the upper wall 8 and to the portion 9a of the respective side wall 9 of the cover portion 7 of the drain tray 1.

Preferably, the holding chamber 14 is in fluid communication with the housing compartment 12 of the drain tray 1 by means of at least one through opening 18 obtained in the front wall 15a of the fixed portion 15 thereof, advantageously at an end edge 15c which faces on the opposite side to the upper wall 8 of the cover portion 9 of the drain tray 1.

According to this configuration, when the level of the hot waste fluid F1 coming from the inlets 13 connected to the solenoid valves 200 of the machine for coffee dispensing 100 accumulates in the holding chamber 14 to such an extent as to reach the level of the through opening 18, it overflows from the holding chamber 14 into the housing compartment 12 of the heat exchange tray 1, occupying the collection cavity 6 of the base portion 2 of the latter.

The removable portion 16 of the holding chamber 14 which closes the latter at the bottom has a structure which substantially recalls the shape of the fixed portion 15. In detail, the removable portion 16 of the holding chamber 14 has an engagement portion 16a that can be inserted inside the fixed portion 15 of the latter and a cover portion 16b transversal with respect to the engagement portion 16a which has an abutment edge 16c destined to abut against the terminal edge 15c of the fixed portion 15 to close the holding chamber 14 at the bottom.

The engagement portion 16a of the removable portion 16 of the holding chamber 14 has at least one slot 16d which, under the condition of the removable portion 16 coupled with the fixed portion 15 thereof, reduces the passage section of the through opening 18 (FIG. 13) from which the hot waste fluid F1 overflows into the housing compartment 12 of the drain tray 1.

Figure 1:
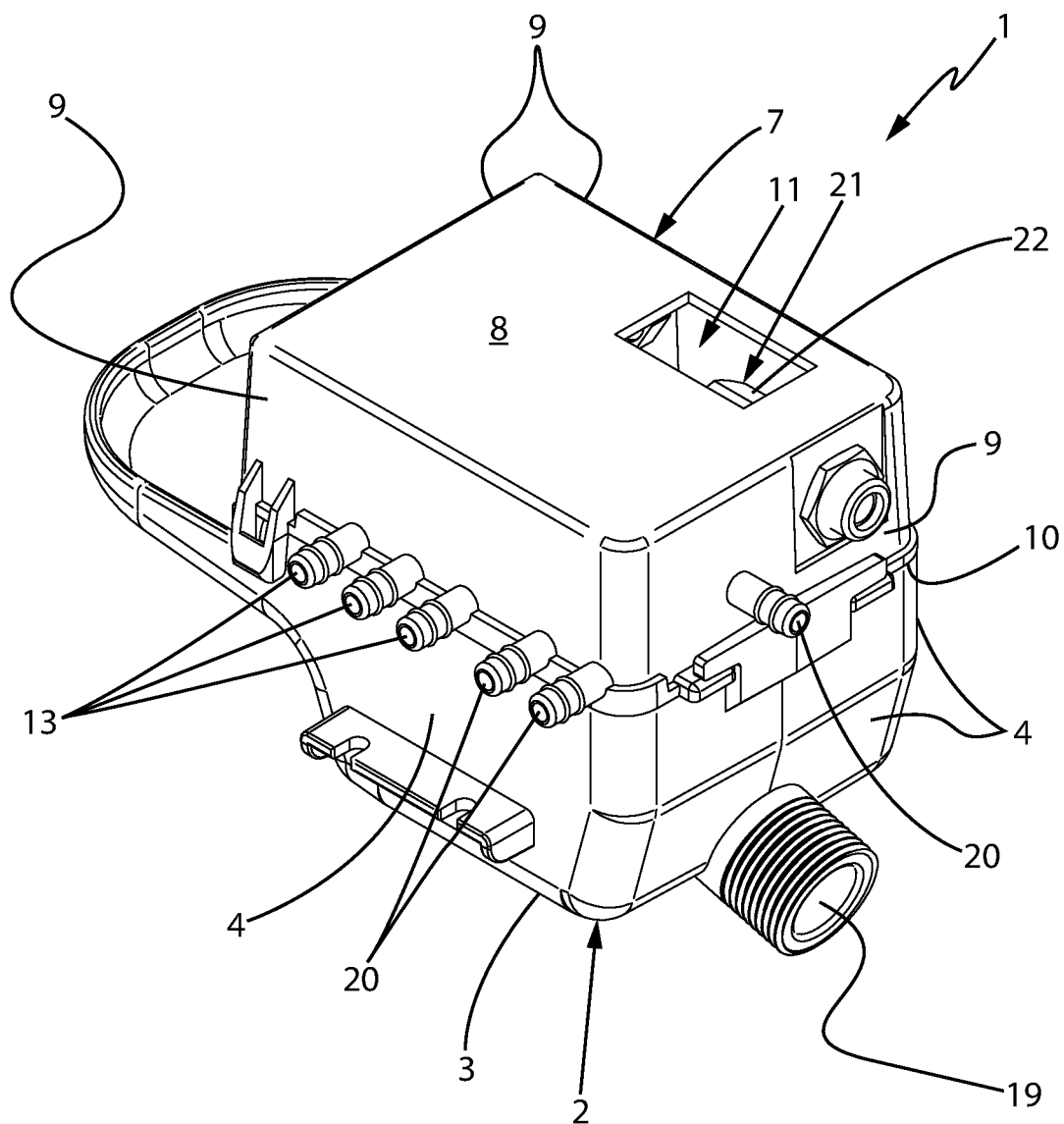
FIG. 1 is a perspective view of a drain tray for solenoid valves of machines for coffee dispensing, in accordance with the present invention.
Figure 2:
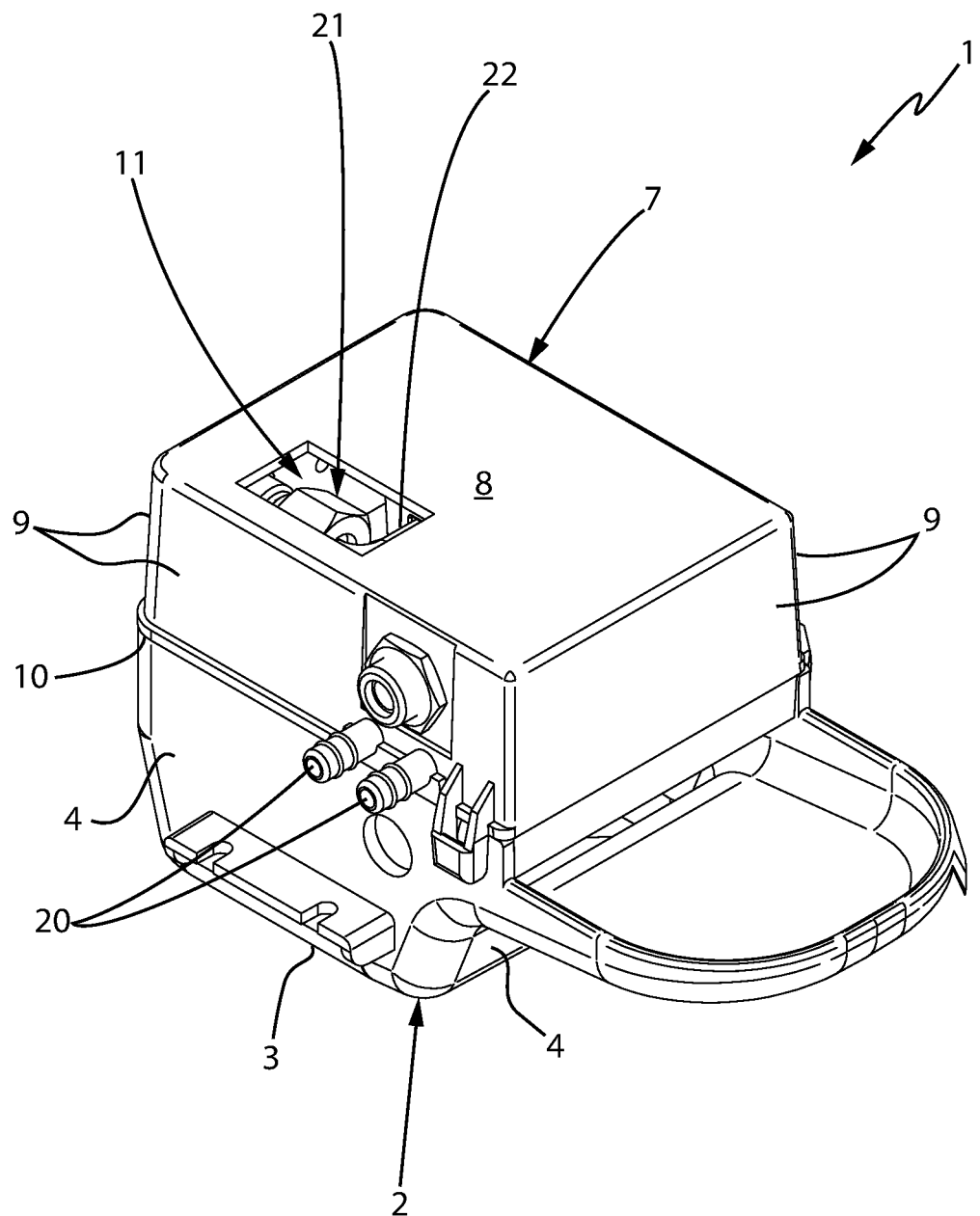
FIG. 2 is a further perspective view of the drain tray of FIG. 1.

As can be seen in FIGS. 1 and 3, the drain tray 1 comprises at least one outlet 19 to allow the outflow of the hot waste fluid F1 which overflows from the through opening 18 and/or of any other fluids of the machine 100 for coffee dispensing which are poured into the housing compartment 12 through a series of auxiliary inlets 20 arranged in the cover portion 7 of the drain tray 1, towards a final drain 101 (FIG. 15) of the machine 100.

In detail, the outlet 19 is made at the bottom 3 of the base portion 2 of the drain tray 1 in such a way as to allow the discharge of all the fluids accumulated in the collection cavity 6 of the latter.

Advantageously, the drain tray 1 comprises at least one heat exchanger 21, in particular in indirect contact, preferably on surface, arranged inside the housing compartment 12.

In detail, the heat exchanger 21 comprises at least one transit duct 22 of a feeding fluid F2 of the machine for coffee dispensing 100 having at least one exchange portion 23 wound in a coil having two or more turns 24. The exchange portion 23 of the transit duct 22 of the heat exchanger 21 develops substantially helically around a reference axis X extending transversely, preferably substantially orthogonally, to at least one side wall 9 of the cover portion 7 of the drain tray 1. Advantageously, the exchange portion 23 of the transit duct 22 of the heat exchanger 21 is arranged at least in part, preferably completely, inside the holding chamber 14.

The transit duct 22 of the heat exchanger 21 is also provided with a first connection fitting 25 in fluid communication with a first end of the exchange portion 23. The first connection fitting 25 transversely develops, preferably substantially orthogonally, with respect to the reference axis X of the exchange portion 23 and at least one respective side wall 9 of the cover portion 7 of the drain tray 1, through a respective assembly/disassembly slot 26 obtained through the front wall 15a of the fixed portion 15 of the holding chamber 14 and suitably insulated, by means of suitable sealing elements (not visible as they are known) when the removable portion 16 is inserted in the fixed portion 15.

The first connection fitting 25 ensures the hydraulic connection between the heat exchanger 21 and the machine 100 for coffee dispensing or to the water network or to a respective water supply source.

The transit duct 22 of the heat exchanger 21 is also provided with a second connection fitting 27 in fluid communication with a second end of the exchange portion 23 opposite to the first end. The second connection fitting 27 has a first section 27a developing substantially parallel to the first connection fitting 25 through a respective assembly slot 26 obtained in the front wall 15a of the fixed portion 15 of the holding chamber 14 and suitably insulated, by means of suitable sealing elements (not visible as they are known), when the removable portion 16 is inserted in the fixed portion 15. The second connection fitting 27 also has a second section 27b developing transversely, preferably substantially orthogonally, to the first section 27a and to the first connection fitting 25.

The second connection fitting 27 ensures the hydraulic connection between the heat exchanger 12 and the water network or a respective water supply source or to the machine 100 for coffee dispensing.

For the purposes of the present invention, it certainly does not matter which of the two connection fittings 25, 27 is connected to the water supply source and which one is connected to the machine for coffee dispensing 100. At least one of the connection fittings 25, 27, preferably both, of the transit duct 22 of the heat exchanger 21 lie on a lying plane proximal to the upper wall 8 of the cover portion 7 of the drain tray 1.

Advantageously, at least a portion of each of the turns 24 of the exchange portion 23 of the transit duct 22 of the heat exchanger 21 develops between the upper wall 8 of the cover portion 7 of the drain tray 1 and the inlets 13 of the hot waste fluid F1 coming from the solenoid valves 200 of the machine 100 for coffee dispensing.

The assembly/disassembly slots 26 are made in such a way as to allow the insertion or removal of the heat exchanger 21 in/from the cover cavity 11 of the cover portion 7 of the drain tray 1 along a direction transversal to the respective upper wall 8.

In detail, each assembly slot 26 of the fixed portion 15 of the holding chamber 14 develops from the respective upper edge 15c towards the upper wall 8 of the cover portion 7 of the drain tray 1.

As can be seen in the schematic representation of FIG. 15, the machine 100 for coffee dispensing is a machine of the known type which comprises:
- a general supply valve 102 connectable to a water network or a similar water supply source arranged in series with a feed pump 103;
- a hydraulic circuit 104 developing from the general supply valve 102 affecting all the components of the machine 100 for coffee dispensing;
- at least one indirect water heating boiler 105 and at least one direct water heating boiler 106 operatively arranged between the general valve 102 and the solenoid valves 200 destined for coffee dispensing to heat the supplied water up to the temperature suitable for the coffee extraction;
- a series of valves and/or components 107 necessary for the correct operation of the machine 100 for coffee dispensing.

Advantageously, as can be seen in the diagram of FIG. 15, the drain tray 1 is in fluid communication with at least one of the solenoid valves 200 of the machine 100 through a respective collection duct 104a of the hydraulic circuit 104.

The excess water at the end of the coffee extraction, which corresponds to the hot waste fluid F1, is conveyed through the collection duct 104a towards a respective inlet 13 of the drain tray 1 in such a way that it floods and, at least partially immerses, the exchange portion 23 of the transit duct 22 of the heat exchanger 21 located in the holding chamber 14 of the housing compartment 12.

The supplied water coming from the general supply valve 102, corresponding to the feeding fluid F2 of the machine for coffee dispensing 100, is conveyed to one of the connection fittings 25, 27 of the transit duct 22 of the heat exchanger 21. In this way, the feeding fluid F2 runs through the entire transit duct 22, crossing the exchange portion 23 of the latter at which it is heated by the effect of the heat exchange with the hot waste fluid F1 present in the holding chamber 14.

The heated water leaving the heat exchanger 21 of the drain tray 1 is, according to needs, sent to one of the boilers 105, 106 in such a way as to feed them with water that is already preheated and thus to reduce the overall energy required for maintaining the operating temperatures of the relative machine 100 for coffee dispensing.

The hot waste fluid F1 that overflows from the holding chamber 14 into the housing compartment 12 reaches the collection cavity 6 of the base portion 2 of the waste tray 1 through the outflow opening 19 located on the bottom 3 of the base portion 2. The fluids accumulated in the collection cavity 6 of the base portion 2 of the drain tray 1 can possibly be reused or discharged through the final drain 101 of the machine 100 for coffee dispensing.

The heat exchange tray 1 and the machine for coffee dispensing 100 provided with said drain tray 1 solve the problems encountered in the prior art and achieve important advantages.

First of all, the preheating carried out by the heat exchanger on the supplied water coming from the water network or from a similar source allows a significant reduction in the overall heat losses of the machines, as it allows the heat of the excess water from the coffee extractions to be exploited.

Naturally, the preheating of the supplied water allows an increase in the performance of the machines which have to use less time and energy to reach operating temperatures.

It should also be considered that the powers of the internal components of the machines on which the heat exchangers are installed according to the present invention are thus optimized.

Finally, it should be highlighted that the preheating of the supplied water by heat exchangers such as the one described above allows a significant reduction in the energy consumption of the machines for coffee dispensing.

The invention claimed is:

1. A drain tray for a machine for coffee dispensing, comprising:
   - a base portion provided with at least one bottom from which transversely extends at least one side wall which terminates at the opposite end to the bottom with at least one engagement edge, the bottom and the side wall of the base portion defining at least one collection cavity for at least one fluid coming from the machine;
   - at least one cover portion provided with at least one upper wall from which transversely extends at least one side wall which terminates at the opposite end to the upper wall with at least one engagement edge arranged to engage the engagement edge of the base portion, the upper wall and the side wall of the cover portion defining at least one cover cavity, the at least one collection cavity and the at least one cover cavity defining a housing compartment of the drain tray;
   - at least one inlet connectable to a solenoid valve of the machine to allow the transit of a hot waste fluid coming from the solenoid valve towards the housing compartment of the drain tray;
   - at least one outlet to allow the outflow of at least one fluid coming from the machine accumulated inside the collection cavity of the base portion of the drain tray;
   - at least one heat exchanger, arranged inside the housing compartment of the drain tray and comprising at least one transit duct of a feeding fluid of the machine having at least one exchange portion wound in a coil and having two or more turns arranged to remain at least partially immersed in the hot waste fluid coming from at least one solenoid valve of the machine; and a holding chamber arranged inside the cover cavity of the housing compartment at least for containing the exchange portion of the transit duct of the heat exchanger, the holding chamber being in fluid communication with the housing compartment through at least one through opening.

2. The drain tray according to claim 1, wherein the exchange portion of the transit duct of the heat exchanger develops helically around a reference axis extending transversely to at least one side wall of the cover portion of the drain tray.

3. The drain tray according to claim 2, wherein the transit duct of the heat exchanger is provided with:

a first connection fitting in fluid communication with a first end of the exchange portion, the first connection fitting transversely developing with respect to the reference axis of the exchange portion and at least one side wall of the cover portion of the drain tray; and a second connection fitting in fluid communication with a second end of the exchange portion opposite to the first end, the second connection fitting having a first section developing parallel to the first connection fitting and a second section developing transversely to the first section and to the first connection fitting.

4. The drain tray according to claim 3, wherein at least one of the first and second connection fittings of the transit duct of the heat exchanger lie on a lying plane proximal to the upper wall of the cover portion of the drain tray.

5. The drain tray according to claim 4, wherein at least a portion of each of the turns of the exchange portion of the transit duct of the heat exchanger develops between the engagement edge of the cover portion of the drain tray and the inlet of the hot waste fluid coming from at least one solenoid valve of the machine.

6. The drain tray according to claim 1, wherein the holding chamber is defined by a fixed portion joined in one piece to the cover portion of the drain tray and a removable portion which can be inserted in the fixed portion and can be fixed thereon by at least one coupling element.

7. The drain tray according to claim 6, wherein the fixed portion of the holding chamber comprises at least two assembly/disassembly slots which allow the insertion or removal of the heat exchanger in/from the same along a direction transversal to the upper wall of the cover portion of the drain tray.

8. The drain tray according to claim 7, wherein each one of the assembly/disassembly slots of the holding chamber develops between a terminal edge of the fixed portion of the holding chamber and the upper wall of the cover portion of the drain tray.

9. A machine, comprising:

at least one general supply valve connectable to a water supply source arranged in series with a feed pump;

at least one indirect water heating boiler and at least one direct water heating boiler operatively arranged between the general valve and at least one solenoid valve;

a hydraulic circuit extending between the general supply valve, the indirect water heating and the direct water heating boilers and the at least one solenoid valve; and at least a drain tray according to claim 1, in fluid communication with the at least one solenoid valve of the machine for fluid dispensing through at least one discharge duct of the hydraulic circuit.

* * * * *